May 29, 1956 W. RICHTER ET AL 2,747,582
MACHINE FOR STEMMING AND BLANKING TOBACCO LEAVES
Filed March 10, 1950 2 Sheets-Sheet 1

United States Patent Office 2,747,582
Patented May 29, 1956

2,747,582

MACHINE FOR STEMMING AND BLANKING TOBACCO LEAVES

Willy Richter, Hamburg-Bergedorf, and Alexander Flocke, Hamburg-Rienbek, Germany, assignors to Kurt Korber & Co. K. G., Hamburg-Bergedorf, Germany Application March 10, 1950, Serial No. 148,772

10 Claims. (Cl. 131—131)

The present invention relates to a machine for stemming and blanking tobacco leaves to be used as cover leaves in the manufacture of cigars, and more particularly to a machine which performs both operations simultaneously and in a continuous process.

The primary object of the present invention is, to provide means for simplified stemming and blanking of contour-shaped cigar cover leaves from natural uncut tobacco leaves. For this purpose we arrange suitable cutting blades around the circumference of two rollers to be rolled off on each other to stem and blank the tobacco leaves, or we arrange one set of cutting blades on a roller and another set on a plate, whereby the two cutting blade sets are brought into cutting engagement by rolling off the roll on the plate. The plate may thereby reciprocate beneath the roller or the plate may be fixed and the roller roll on the plate. It is also possible to put several of said plates, hereinafter termed die plates, on an endless conveying belt passing beneath the roller, hereinafter termed cutting roller, to cuttingly engage the corresponding blades.

The construction and form of machines working according to the principle of this invention may vary widely. All, however, have at least one cutting roller as principal part, whereas a second roller may be provided in some embodiments to take the counteracting cutting blades, or the second roller may be replaced by a die plate.

Figure 1:
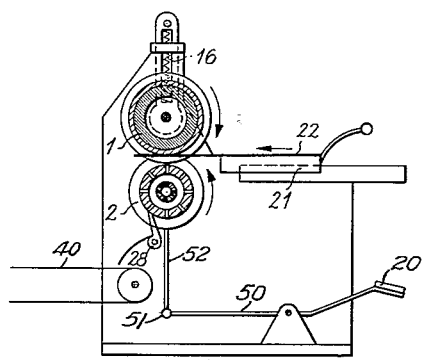
Fig. 1 shows a diagrammatic side elevation of a stemming and cigar cover leaf blanking machine having two cutting rollers.
Figure 2:
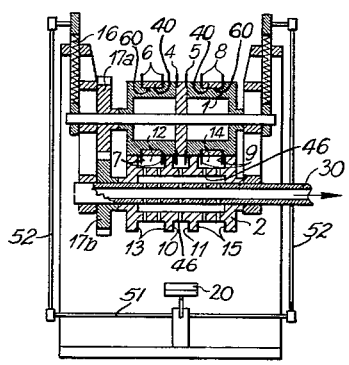
Fig. 2 shows a diagrammatic front elevation of the above machine, sectioned at the center line of the cutting rollers.
Figure 3:
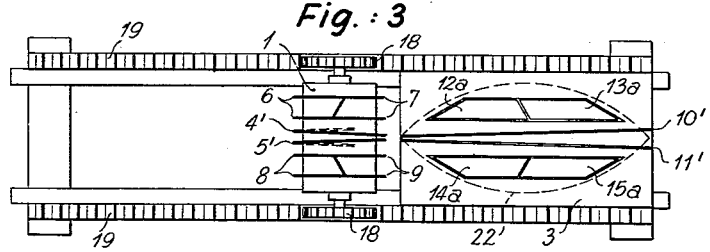
Fig. 3 is a diagrammatic top view of a machine having one cutting roller and a die plate reciprocatingly arranged beneath said roller.
Figure 4:
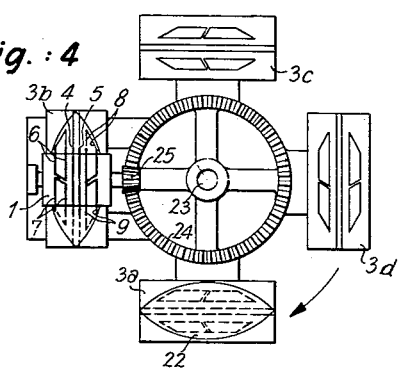
Fig. 4 is a diagrammatic top view of a machine having one cutting roller and four die plates, arranged equidistantially and revolvably around a vertical axis, to be brought successively into cutting engagement with said cutting roller.
Figure 5:
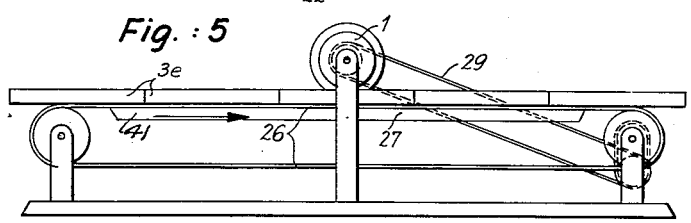
Fig. 5 shows an embodiment of the invention in which a number of die plates are arranged along an endless conveying belt passing beneath the cutting roller which is rotatably mounted above said belt.
Figure 6:
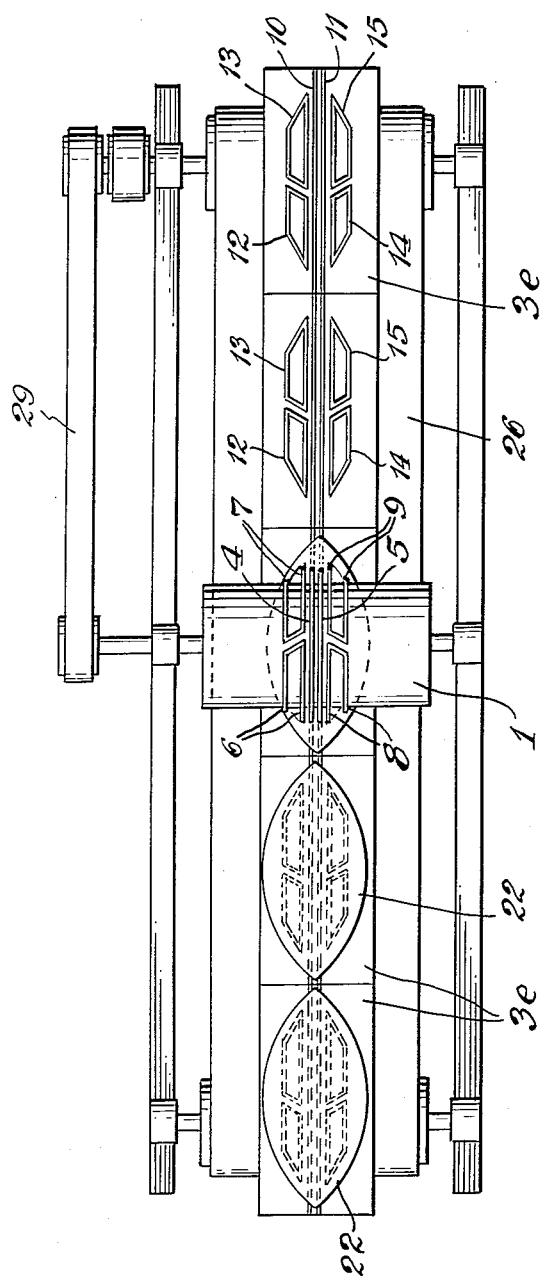
Fig. 6 shows a plan view of the embodiment illustrated in Fig. 5.

Embodied in all the embodiments illustrated in the drawing is a cutting roller 1, provided with cutting blades on its circumferential surface, said blades 4, 5 (Figs. 2, 4 and 6) being disposed approximately at the middle of the axial length of the roller and serving to cut out the main stem of the tobacco leaf. Other blades 6, 7, 8 and 9 are located toward both ends of the roller and have proper configuration for cutting contoured blanks to be readily used as cover leaves for cigars. The blades 4, 5, serving to stem the leaves, may run parallel to each other as shown in Figs. 2, 4 and 6, or they may be disposed at a slight angle relative to each other as indicated at 4', 5' in Fig. 3, to conform more closely to the natural shape of the stem. The cutting roller 1, vertically slidably secured in the side uprights of the machine, is resiliently urged downward by springs 16, and may be lifted against the spring action by a foot lever 20, connected with the roller support through a lever and link system 50, 51, 52. Cooperating with the cutting roller 1, Figs. 1 and 2, is a cutting roller 2 carrying counter-blades 10, 11 for stemming and blades 12, 13, 14 and 15 for contour-cutting of the blanks, all in proper relation to the cutting blades on roller 1. The rollers 1 and 2 are interlocked with each other by spur gears 17a, 17b, so the relation of cooperating cutting edges can not change. In the modified construction shown in Fig. 3 the cutting roller 1, cooperates with a die plate 3 to effect the cutting operation. The die plate carries, in proper relation to the cutting blades on the roller, the corresponding counter-blades which comprise the stemming blades 10', 11', disposed at the same relative angle as the blades 4', 5', and, at both sides thereof, the contour-cutting blades 12a, 13a, 14a and 15a. Proper relation between the cutting edges of the blades on roller 1 and die plate 3 is maintained during operation by toothed racks 19 on the die plate meshing with spur gears 18 on the roller. In another embodiment of the invention as illustrated in Fig. 4, the cutting roller 1, carrying the stemming blades 4, 5 and contour-cutting blades 6, 7, 8, 9, cooperates with four die plates 3a, 3b, 3c and 3d, equidistantially arranged around a vertical axis 23, adapted to be successively brought into cutting engagement with the cutting roller 1. Proper relation between cutting roller 1 and the die plates is maintained by a crown gear 24 and pinion 25, the latter being keyed to the shaft of cutting roller 1. Proper relation of the teeth on crown gear 24 and pinion 25 ensures that the cutting blades of each one of the four die plates come in proper cutting relation with the corresponding blades on cutting roller 1 when the unit comprising the die plates and the gear 24 is driven by a power source not shown in the drawing. Still another embodiment of the invention is shown in Figs. 5 and 6, in which a number of die plates 3e are arranged along an endless conveying belt 26 which carries the die plates 3e with corresponding cutting blades, 10 to 15, inclusive, into cutting engagement with the blades 4 to 9 inclusive on the cutting roller 1. Proper relation between roller 1 and die plates 3e is maintained by an interlocking chain drive 29 or the like between conveying belt and cutting roller.

In operating the machine as shown in Figs. 1 and 2, a tobacco leaf 22 is spread flatly on a pad 21 and moved towards the rollers 1, 2. As the rollers rotate in the direction of the arrows, the leaf 22 is moved in between them and caused to adhere to the circumferential surface of roller 2 by suction created within said roller by a suitable suction pump (not shown) connected with the hollow interior of the drum and thus with apertures 46 in the drum through a hollow shaft 30. Continued rotation of the cutting rollers causes the cutting blades 4, 5 of the roller 1 to cuttingly engage the stemming blades 10, 11 of the roller 2 and sever the stem from the leaf. At the same time contour-cutting blades 6, 7, 8, 9 of roller 1 engage the counter-blades 12, 13, 14, 15 of roller 2 and cut cigar cover leaf blanks out of the tobacco leaf body. The severed stems, adhering to roller 2, are stripped off by a finger 28 and carried away by a conveyor belt 40. The cover leaf blanks are removed from roller 2 in any known manner, the upper roller 1 simultaneously preferably being raised somewhat by operation of the foot lever 20. In the machine according to Fig. 3 the tobacco leaves 22 are placed directly on the blades on the die plate 3 whereupon plate and roller are moved relative to each other so that the blades on the roller cuttingly engage the blades on the die plate, whereby the tobacco leaf is cut as above described in connection with Figs. 1 and 2. It will be understood that the relative movement between die plate and cutting roller may be performed by either moving the roller or the plate as may be preferred.

The embodiment of the machine illustrated in Fig. 4 permits a continuous stemming and blanking operation, in that it provides four die plates and four working stations for a complete working cycle. At station 3a the tobacco leaves 22 are placed on the die plates. As the die plates revolve around the vertical axis 23 in the direction of the arrow, the die plate at 3a advances to the next station 3b and passes beneath the cutting roller 1. The cutting roller rotates and cuts the leaf at the desired lines while the die plate moves onward. At station 3c the stem and other severed parts of the leaf are removed and at station 3d the ready cut cigar cover leaf blanks are removed.

In the embodiment illustrated in Figs. 5 and 6 the die plates 3e with tobacco leaves 22 placed thereon are successively placed on the endless belt 26 at the left hand side of cutting roller 1. As the conveying belt 26 moves in the direction of the arrow, it carries the die plates forward beneath the cutting roller 1 where the leaves are cut in the same manner as previously described. Stems, remnants and blanks are thereafter sorted out on the conveyor at the right hand side of the cutting roller 1. To assure proper cutting pressure by preventing the belt from sagging beneath the cutting roller, a supporting member 41 is provided beneath the belt.

To ensure speedy removal of the leaf blanks after the cutting operation any suitable known means may be used. The construction of the cutting roller 1 is preferably such that the cutting blades are removably secured by clamping members or collars 40 in grooves in the rollers, so that dull blades may readily be exchanged for sharp ones whenever required. Provisions are preferably also made for exchange of rollers and die plates, so as to adapt the machine for different sizes of tobacco leaves and for different sizes and shapes of cigar cover blanks as conditions require.

From the description it will be seen that the invention lends itself to various modifications. Different constructions and arrangements of parts are possible within the scope of the appended claims, and it will be understood that instead of cutting blades other severing means, such as punches, knives, and like conventional means, may be applied to perform the stemming and blanking operation in accordance with this invention.

What we claim is:

1. A machine for stemming and blanking tobacco leaves, comprising a frame, a roller rotatably mounted in said frame, a counter member for cooperating with said roller, cutting blades on said roller adapted for a stemming operation, other cutting blades on said roller forming a closed contour and disposed between said first-mentioned cutting blades and the end of the roller, and means on said counter member for cooperation with said first-mentioned and said other cutting blades so as to enable simultaneous stemming and blanking of the tobacco leaves.

2. A machine as set forth in claim 1, in which said counter member comprises a roller and said means on said counter member comprise cutting blades.

3. A machine as set forth in claim 1, in which said counter member comprises a die plate and said means on said counter member comprise cutting blades.

4. A machine as set forth in claim 1, in which said roller is provided with collars between which the cutting blades are removably mounted.

5. A machine as set forth in claim 1 in which said first mentioned cutting blades converge in conformity to the tapered natural shape of a tobacco leaf stem.

6. A machine for stemming and blanking tobacco leaves, comprising a frame, a first roller rotatably mounted in said frame, a counter member for said first roller comprising a second roller, means in said frame for rotatably supporting said second roller, complementary annular cutting blades on said first and second rollers adapted for a stemming operation, other cutting blades on said first and second rollers forming a closed contour and disposed between said first-mentioned cutting blades and the end of said rollers, means for coupling said first roller with said second roller for simultaneous rotation, and means for disengaging and separating said rollers from each other.

7. A machine for stemming and blanking tobacco leaves, comprising a frame, a roller rotatably mounted in said frame, a counter member comprising a die plate for cooperation with said roller, annular cutting blades on said roller adapted for a stemming operation, other cutting blades on said roller forming a closed contour and disposed between said cutting blades and the end of said roller, means on said die plate for cutting cooperation with said cutting blades, means for slidably supporting said die plate, and means for coupling said die plate with said roller for simultaneous movement at a fixed relative linear surface speed.

8. A machine for stemming and blanking tobacco leaves, comprising a frame, a roller rotatably mounted in said frame, a counter member for cooperation with said roller comprising a number of die plates, annular cutting blades on said roller adapted for a stemming operation, other cutting blades on said roller forming a closed contour and disposed between said first-mentioned cutting blades and the end of the rollers, means on said die plates for cutting cooperation with said annular and other cutting blades, means for supporting said die plates in said frame, and means for moving said die plates successively into engagement with said roller.

9. A machine as set forth in claim 8, in which said die plates are equidistantially arranged around a vertical axis to be brought successively into cutting engagement with said cutting roller.

10. A machine as set forth in claim 8, in which said die plates are attached to a conveyor successively carrying said die plates into cutting engagement with said cutting roller.

References Cited in the file of this patent

UNITED STATES PATENTS

| | | |
|---|---|---|
| 127,235 | Heywood | May 28, 1872 |
| 180,951 | Smothers | Aug. 8, 1876 |
| 420,452 | Hathaway | Feb. 4, 1890 |
| 781,489 | Blundell | Jan. 31, 1905 |
| 2,152,708 | Potdevin | Apr. 4, 1939 |

FOREIGN PATENTS

| | | |
|---|---|---|
| 595,005 | Germany | Mar. 27, 1934 |